A. TAUBERT.
GREEN CORN SPOON.
APPLICATION FILED OCT. 25, 1913.
1,110,161.
Patented Sept. 8, 1914.
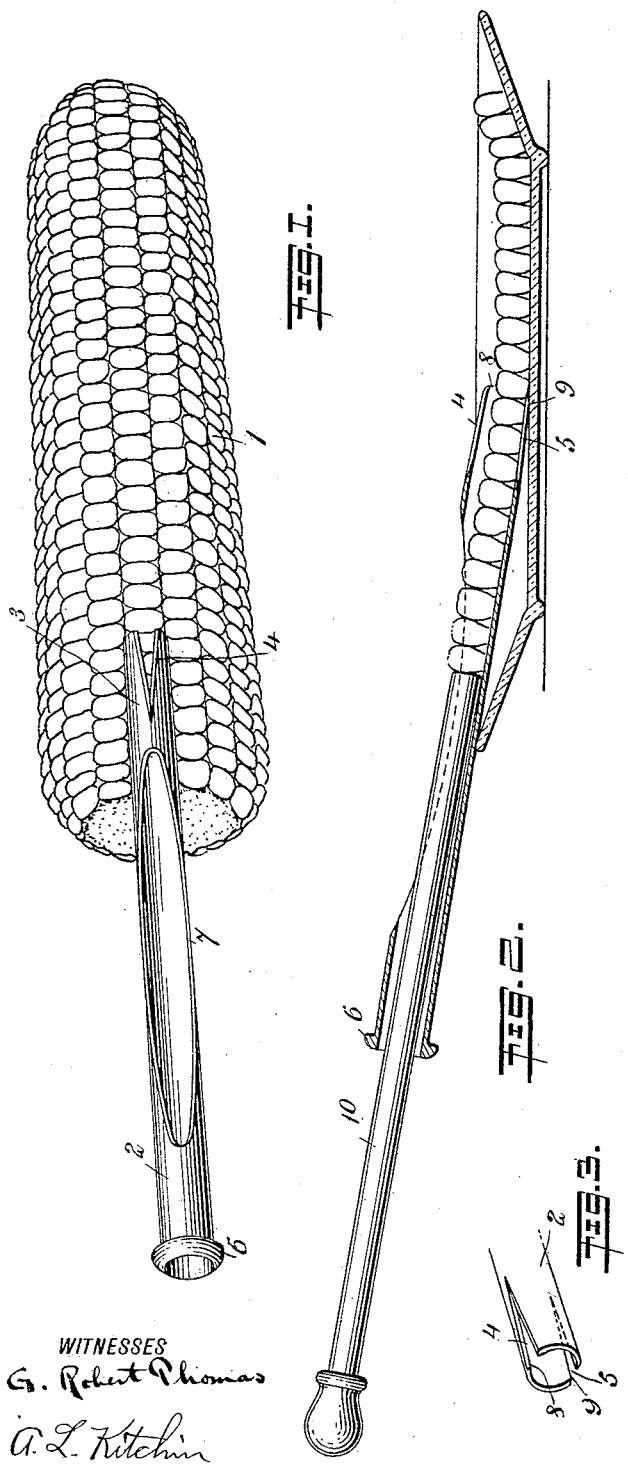
WITNESSES
G. Robert Thomas
A. L. Kitchin
INVENTOR
Albert Taubert
BY
ATTORNEYS
THE NORRIS PETERS CO., PHOTO-LITHO., WASHINGTON, D. C.

UNITED STATES PATENT OFFICE.

ALBERT TAUBERT, OF NEW YORK, N. Y.

GREEN-CORN SPOON.

1,110,161.  Specification of Letters Patent.  Patented Sept. 8, 1914.

Application filed October 25, 1913. Serial No. 797,222.

*To all whom it may concern:*

Be it known that I, ALBERT TAUBERT, a citizen of the United States, and a resident of the city of New York, county of the Bronx, and State of New York, have invented a new and Improved Green-Corn Spoon, of which the following is a full, clear, and exact description.

This invention relates to improvements in green corn spoons, and has for an object to provide an improved structure which will readily remove the grains of corn without mashing the same.

Another object of the invention is to provide an improved instrument in the nature of a spoon which may be used for cutting the grains of corn from an ear and either leaving the corn in place on the cob after being severed therefrom or placing the rows of grains on a receptacle.

In carrying out the object of the invention a spoon may be provided formed substantially tubular and with an upper and lower V-shaped notch provided in one end, and a cut-out portion intermediate the ends.

In the accompanying drawing—Figure 1 is a perspective view of an ear of corn with a tubular spoon embodying the invention associated therewith; Fig. 2 is a transverse section through a plate and a spoon embodying the invention, a suitable pusher or ram-rod being shown in connection therewith; Fig. 3 is a detailed fragmentary perspective view of the cutting end of the spoon shown in Fig. 1.

Referring to the accompanying drawing by numeral 1 indicates an ear of corn of any desired kind, and 2 what may be termed a tubular spoon. The spoon 2 is formed from a tube with the front end 3 provided with an upper A-shaped notch 4, and a lower A-shaped notch 5, while the opposite end is formed with a reinforcing bead 6. On the top between the ends of the device is arranged a cut-out or notched-out portion 7 which may be of any desired length, preferably extending almost from one end of the spoon to the other. The A-shaped notches 4 and 5 are formed with cutting edges 8 and 9, respectively, so as to engage the grains at or near the base and remove the same by a shearing action, whereby the grains are in their proper or natural condition after severing. Associated with the tubular spoon 2 is a pusher or rod 10, designed to be used for removing the grains of corn from the spoon, as shown in Fig. 2, whereby the grains of corn may be arranged in lines upon the plate. If desired, after the spoon 2 has been moved for almost the full length of the ear 1 the rod 10 may be placed thereon and pressed slightly against the row of grains, after which the spoon may be removed and the grains left in their original position except that they are severed from the cob. The ear 1 may then be served in this manner. It will also be evident that the grains may be removed by either of the V-shaped notches 4 and 5 and placed in a dish in a mixed condition without departing from the spirit of the invention.

What I claim is—

1. In a corn spoon of the character described, a bowl portion formed with a tubular end substantially the width of a grain of corn, said tubular end having a V-shaped notch arranged therein, and the walls of the notch being formed sharpened for providing a shearing action when the spoon is forced into an ear of corn, said bowl portion being comparatively long in proportion to its width.

2. In a corn spoon of the character described, a tubular member having a diameter substantially the width of a grain of corn formed with a pair of V-shaped notches in one end, each of said notches having a pair of cutting edges, said tubular member being comparatively long in respect to its width.

3. In a corn spoon of the character described, a tubular member having a diameter substantially the width of a grain of corn formed with a cut-away portion extending for almost the entire length of the tubular member, and a pair of notches at one end, one of said notches being on the same side as said cut-away portion, and the other of said notches being on the opposite side, each of said notches having sharpened edges, said tubular member being long in proportion to its width.

4. In a device of the character described, a tubular member having a diameter substantially the width of a grain of corn formed with a notch in one end, said notch having the walls thereof sharpened, and a pressing rod arranged in said tubular member, said tubular member being long in proportion to its width.

5. In a device of the character described, a tubular member having a diameter substantially the width of a grain of corn formed with a cut-away portion intermediate the ends for removing cut grains, and a notch at the extreme ends, said notch being formed with walls provided with cutting edges, said tubular member being long in proportion to its width.

In testimony whereof I have signed my name to this specification in the presence of two subscribing witnesses.

ALBERT TAUBERT.

Witnesses:
A. L. KITCHIN,
PHILIP D. ROLLHAUS.

Copies of this patent may be obtained for five cents each, by addressing the "Commissioner of Patents, Washington, D. C."